(12) United States Patent
Miyamoto

(10) Patent No.: US 8,018,433 B2
(45) Date of Patent: Sep. 13, 2011

(54) INFORMATION PROCESSING APPARATUS

(75) Inventor: Tomofumi Miyamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 92 days.

(21) Appl. No.: 12/635,608

(22) Filed: Dec. 10, 2009

(65) Prior Publication Data

US 2010/0194680 A1 Aug. 5, 2010

(30) Foreign Application Priority Data

Jan. 30, 2009 (JP) ................................. 2009-020378

(51) Int. Cl.
*G09G 5/00* (2006.01)
(52) U.S. Cl. ........................................ 345/156; 345/168
(58) Field of Classification Search .......... 345/156–179; 341/22–34
See application file for complete search history.

(56) References Cited

U.S. PATENT DOCUMENTS

| 6,304,250 B1 * | 10/2001 | Yang et al. ..................... 345/168 |
| 6,509,845 B1 * | 1/2003 | Tanaka ........................... 345/168 |
| 2007/0070048 A1 | 3/2007 | Aoyanagi |

FOREIGN PATENT DOCUMENTS

| JP | 05-189121 A | 7/1993 |
| JP | 2001-195180 A | 7/2001 |
| JP | 2004-030160 A | 1/2004 |
| JP | 2007-094808 A | 4/2007 |
| JP | 2008-123433 | 5/2008 |
| JP | 2008-123433 A | 5/2008 |

OTHER PUBLICATIONS

Notification of Reason for Refusal mailed by Japan Patent Office on Mar. 16, 2010 in the corresponding Japanese patent application No. 2009-020378.
Decision of Refusal mailed by Japan Patent Office on Jun. 15, 2010 in the corresponding Japanese patent application No. 2009-020378.
IDS Information Sheet.

* cited by examiner

*Primary Examiner* — Regina Liang
(74) *Attorney, Agent, or Firm* — Knobbe, Martens, Olson & Bear LLP

(57) ABSTRACT

According to an aspect of the invention, an information processing apparatus includes: a main body comprising a top face; a display module configured to be connected to the main body and configured to be rotatable between a closed position and an open position, the display module covering the top face at the close position and exposing the top face at the open position; a wireless communication module in the main body; a plurality of input devices in the main body; a processing module configured to perform a process corresponding to a manipulation signal that is send from the input devices to the processing modules; an input device setting module configured to select one of the input devices from the input devices as a selected input device; and an input manipulation control module configured to control the processing module so as to prevent the processing module from performing a processing corresponding to a manipulation signal received by the selected input device while the wireless communication module performs a wireless communication.

4 Claims, 9 Drawing Sheets

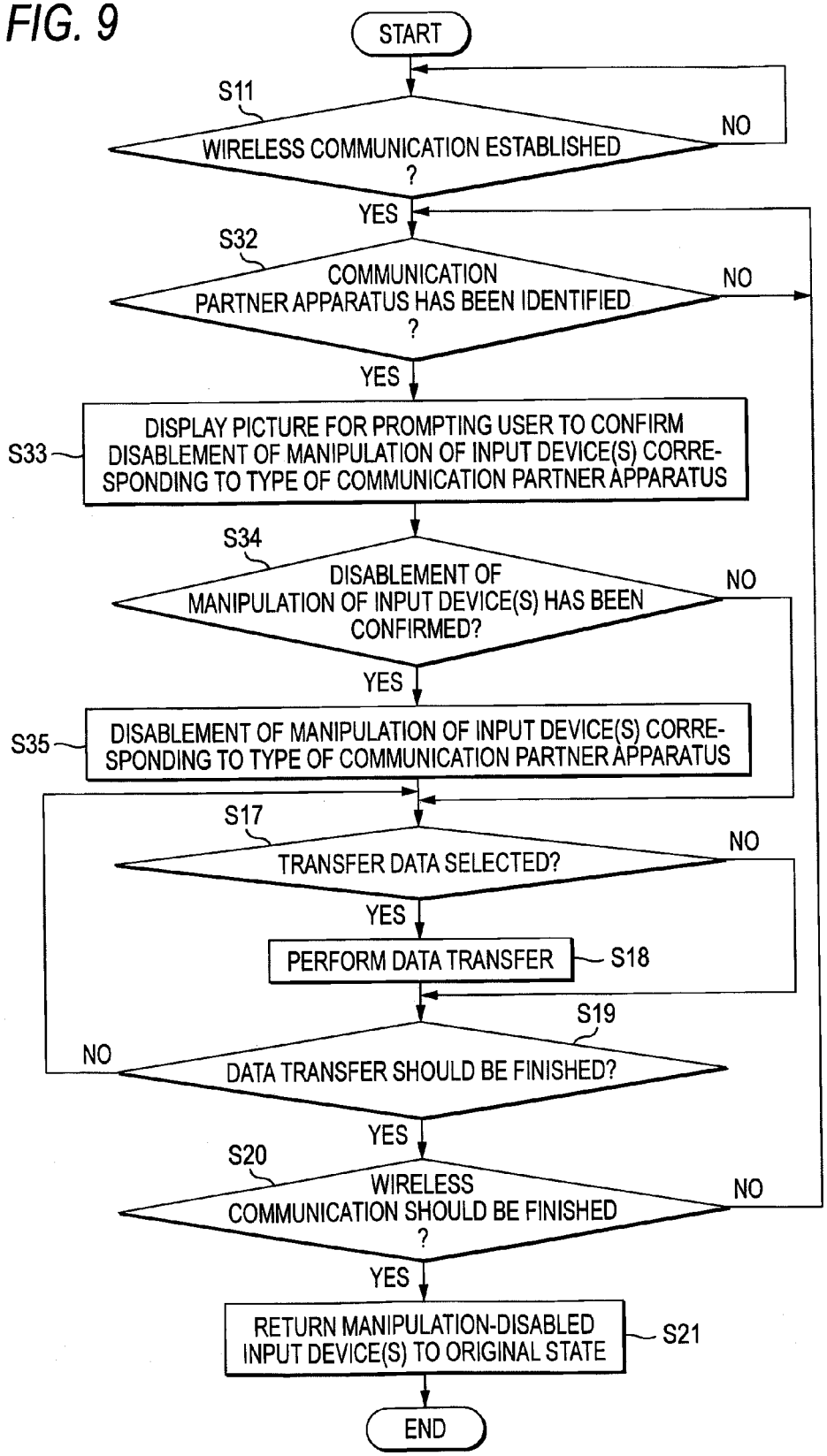

INFORMATION PROCESSING APPARATUS

CROSS-REFERENCE TO RELATED APPLICATIONS

This application is based upon and claims the benefit of priority from Japanese Patent Application No. 2009-020378, filed Jan. 30, 2009, the entire contents of which are incorporated herein by reference.

BACKGROUND

1. Field

The present invention relates to an information processing apparatus having a wireless communication function.

2. Description of the Related Art

Among non-contact IC (integrated circuit) card readers are ones that are equipped with a ten-key unit which is provided in the outer surface of a body and serves for input of a signal through contact and a wireless communication module which is provided inside the body near the ten-key unit and has a wireless communication antenna. Such non-contact IC card readers are associated with the following problem: If a user manipulates the ten-key unit with his or her hand that holds a non-contact IC card, the non-contact IC card goes into the detection region of the antenna and a wireless communication is performed between the non-contact IC card and the wireless communication module with unintended timing, resulting in an erroneous operation. To solve this problem, a technique is disclosed in which wireless communication between the non-contact IC card and the wireless communication module is disabled while the ten-key unit is being manipulated and manipulation of the ten-key unit is disabled while a wireless communication is being performed between the non-contact IC card and the wireless communication module (refer to JP-A-2008-123433, for example).

Also in personal computers etc., a wireless communication module for data transfer and input devices for input of a manipulation signal to the main body may be disposed close to each other. However, if the input devices are controlled by using the above technique to assure a stable wireless communication, all of the plural input devices such as a keyboard and a touch pad are disabled. Therefore, when a data transfer is performed that takes long time, the fact that the personal computer cannot be manipulated at all until completion of the data transfer is inconvenient to the user. Furthermore, where plural data are to be transferred, it is more convenient to enable manipulation of part of the input devices to allow, before a transfer, selection of data to be transferred.

Therefore, to apply the above technique to a personal computer which is equipped with plural input devices, only an input device(s) that may cause an erroneous operation should be disable and the other input device(s) that are free of such a possibility should be enable.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 9 is a flowchart of a setting procedure according to the second embodiment which is followed when an input device (s) is controlled in connection with a wireless communication.

DETAILED DESCRIPTION

Various embodiments according to the invention will be described hereinafter with reference to the accompanying drawings. In general, according to one embodiment of the invention, there is provided an information processing apparatus including: a main body comprising a top face; a display module configured to be connected to the main body and configured to be rotatable between a closed position and an open position, the display module covering the top face at the close position and exposing the top face at the open position; a wireless communication module in the main body; a plurality of input devices in the main body; a processing module configured to perform a process corresponding to a manipulation signal that is send from the input devices to the processing modules; an input device setting module configured to select one of the input devices from the input devices as a selected input device; and an input manipulation control module configured to control the processing module so as to prevent the processing module from performing a processing corresponding to a manipulation signal received by the selected input device while the wireless communication module performs a wireless communication.

Embodiments of the present invention will be hereinafter described with reference to FIGS. 1 to 9 for a case that the invention is applied to a personal computer which is an example information processing apparatus.

Figure 1:
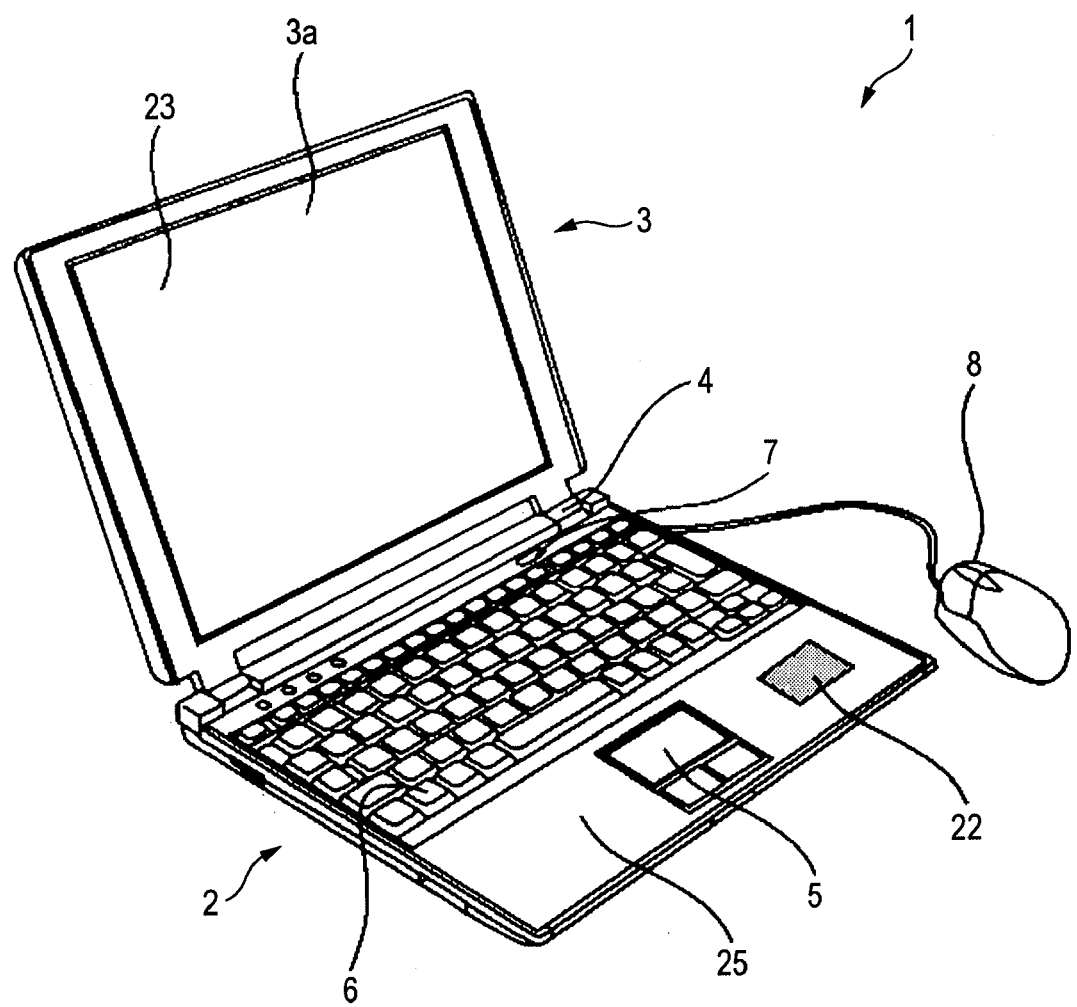
FIG. 1 is a perspective view showing an appearance of a first personal computer according to a first embodiment.

First, a first embodiment will be described with reference to FIGS. 1 to 7. FIG. 1 is a perspective view showing an appearance of a first personal computer 1 according to the first embodiment.

The personal computer 1 is composed of a computer main body 2 and a display module 3. A display device 3a is incorporated in the display module 3. In this specification, the terms "right," "left," "front," and "rear" are defined as seen from the user and is using the personal computer 1 while facing the display device 3a.

A touch panel 23 is laid on the front surface of the display device 3a. The display module 3 is attached to hinges 4 that are provided at rear end positions of the computer main body 2 so as to be rotatable between a closed position where it covers the top surface of the computer main body 2 and an open position where it renders the top surface of the computer main body 2 exposed. The computer main body 2 has a thin, box-shaped body and a keyboard 6 is provided in the top surface of the body so as to occupy its central portion. A front portion of the top surface of the body of the computer main body 2 is formed with a palm rest 25. A touch pad 5 is provided approximately at the center of the palm rest 25. A communication module 22 is provided on the right of the touch pad 5. A power switch 7 for powering on/off the computer main body 2 is provided on the rear side in the top surface of the body of the computer main body 2. It is assumed that a mouse 8 as an input device is connected to the personal computer 1 according to the embodiment via a USB (universal serial bus) cable or the like.

In the personal computer 1 according to the embodiment, the communication module 22 is incorporated so as to be located in the range of the palm rest 25 within such a distance of a communication partner apparatus that a communication can be established with it and a communication is performed with a communication partner apparatus which is placed on the palm rest 25. As a result, a communication partner apparatus comes to be placed near such an input device as the touch pad 5 or the keyboard 6. When a communication partner apparatus is powered on, there may occur a phenomenon that an input device erroneously recognize, as a manipulation signal, faint radio waves that are emitted from the communication partner apparatus (i.e., noise is generated). In the personal computer 1, which is high in compactness, the distance between the communication module 22 and each of the input devices provided in the top surface of the computer main body 2 is short. Therefore, if a wireless communication is performed in such a manner that the communication partner apparatus is placed on the communication module 22, physical contact with an input device provided in the top surface of the computer main body 2 may occur. Therefore, the input devices need to be controlled so as to prevent an unintended input due to such noise or physical contact.

Although in the embodiment the communication module 22 is located on the right of the touch pad 2, the invention is not limited to such a case. That is, the communication module 22 may be located in the rear of the keyboard 6. In this case, a communication partner apparatus is placed on the rear side and hence physical contact or noise involving the touch pad 5 would not be prone to occur. Therefore, it is not necessary to restrict the input through the touch pad 5. On the other hand, since the keyboard 6 is close to the communication module 22, physical contact or noise involving the keyboard 6 may occur. Therefore, it is necessary to restrict the input through the keyboard 6. Interruption or the like of a wireless communication due to an unintended operation of an input device can be prevented by the user's closely setting an input device(s) whose manipulation should be disabled, according to the position of the communication module 22.

Figure 2:
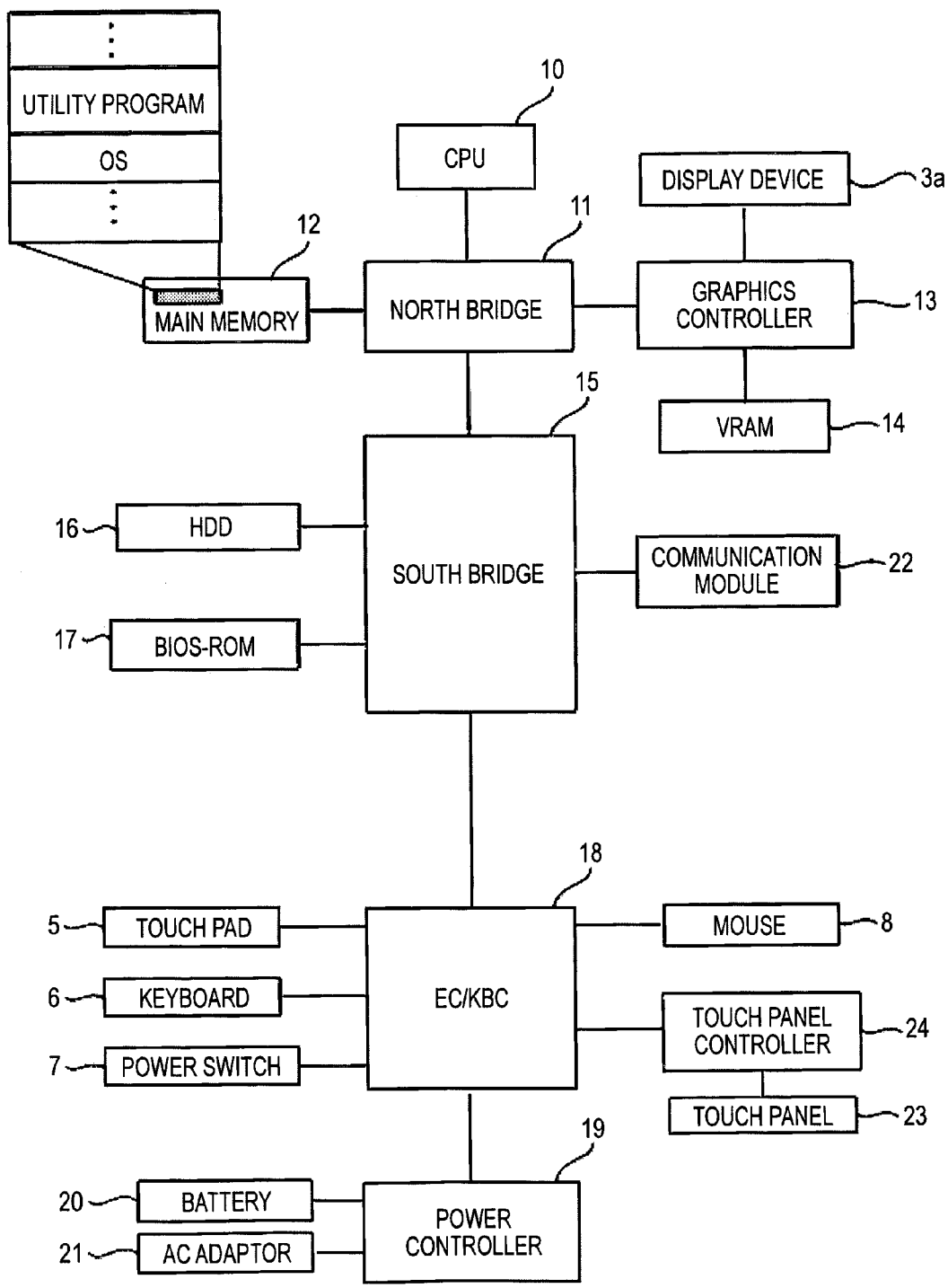
FIG. 2 is a block diagram showing the configuration of a signal processing system of the first personal computer according to the first embodiment.

FIG. 2 is a block diagram showing the configuration of a signal processing system of the personal computer 1 according to the first embodiment. The personal computer 1 according to the first embodiment is equipped with the display device 3a, the touch pad 5, the keyboard 6, the power switch 7, the mouse 8, a CPU (central processing unit) 10, a north bridge 11, a main memory 12, a graphics controller 13, a VRAM 14 (video random access memory) 14, a south bridge 15, an HDD (hard disk drive) 16, a BIOS-ROM (basic input/output system-read only memory) 17, an EC/KBC (embedded controller/keyboard controller) 18, a power controller 19, a battery 20, an AC adaptor 21, the communication module 22, a touch panel controller 23, and the touch panel 24.

The display device 3a displays video on the basis of a video signal that is supplied from the graphics controller 13.

The touch pad 5, the keyboard 6, and the mouse 8 are input devices which generate various manipulation signals in response to manipulations by the user.

The power switch 7 generates a control signal for powering on or off the personal computer 1 in response to a manipulation by the user.

The CPU 10, which is a processor for controlling the operations of the personal computer 1, runs the operating system and various application programs that are loaded into the main memory 12 from the HDD 16. The CPU 10 also loads a system BIOS into the main memory 12 from the BIOS-ROM 17 and runs it. The system BIOS is a program for hardware control.

The north bridge 11 is a bridge device which connects a local bus of the CPU 10 to the south bridge 15. The north bridge incorporates a memory controller for access-controlling the main memory 12. The north bridge 11 also has a function of performing a communication with the graphics controller 13 via an AGP (accelerated graphics port) bus or the like.

The main memory 12 is what is called a working memory in which the operating system and various applications stored in the HDD 16 and the system BIOS stored in the BIOS-ROM 17 are to be developed.

The graphics controller 13 is a display controller for controlling the display device 3a which is used as a display monitor of the personal computer 1. The graphics controller 13 generates a video signal of a display image to be displayed on the display device 3a on the basis of display data that is drawn in the VRAM 14 by the operating system and an application program. The video signal generated by the graphics controller 13 is output to the line.

The south bridge 15 controls the access to the BIOS-ROM 17 and also controls disc drives (I/O devices) such as the HDD 16 and an ODD (optical disc drive). In the embodiment, the communication module 22 for performing a wireless communication with an external apparatus is connected to the south bridge 15.

The HDD 16 is a storage device for storing the operating system, various application programs, etc.

The BIOS-ROM 17 is a rewritable nonvolatile memory for storing the system BIOS which is a program for hardware control.

The EC/KBC 18 controls the touch pad 5 and the keyboard 6 which are input means.

The EC/KBC 18 is a one-chip microcomputer for monitoring and controlling various devices (peripheral devices, sensors, power circuits, etc.) irrespective of the system status of the personal computer 1. The EC/KBC 18 also has a function of powering on/off the personal computer 1 in cooperation with the power controller 19 in response to a manipulation of the power switch 7 by the user.

Where external power is supplied via the AC adaptor 21, the power controller 19 generates system power to be supplied to the individual components (computer main body 2 and display module 3) of the personal computer 1 using the external power that is supplied from the AC adaptor 21. Where no external power is supplied via the AC adaptor 21, the power controller 19 generates system power to be supplied to the individual components of the personal computer 1 using the battery 20.

The communication module 22, which is a module for performing a wireless communication with an external apparatus, is composed of a radio antenna, a wireless communication circuit, etc.

The touch panel 23, which is laid on the front surface of the display device 3a, is an input device which generates a manipulation signal corresponding to information displayed on the display device 3a at a position where the user touches the touch panel 23.

The touch panel controller 24 detects the position of a portion, touched with a finger of the user, on the touch panel 23 and inputs a detection result to the EC/KBC 18. For example, a tablet (digitizer) which enables position designation with a pen and a tablet controller (digitizer controller) may be used instead of the touch panel 23 and the touch panel controller 24.

Figure 3:
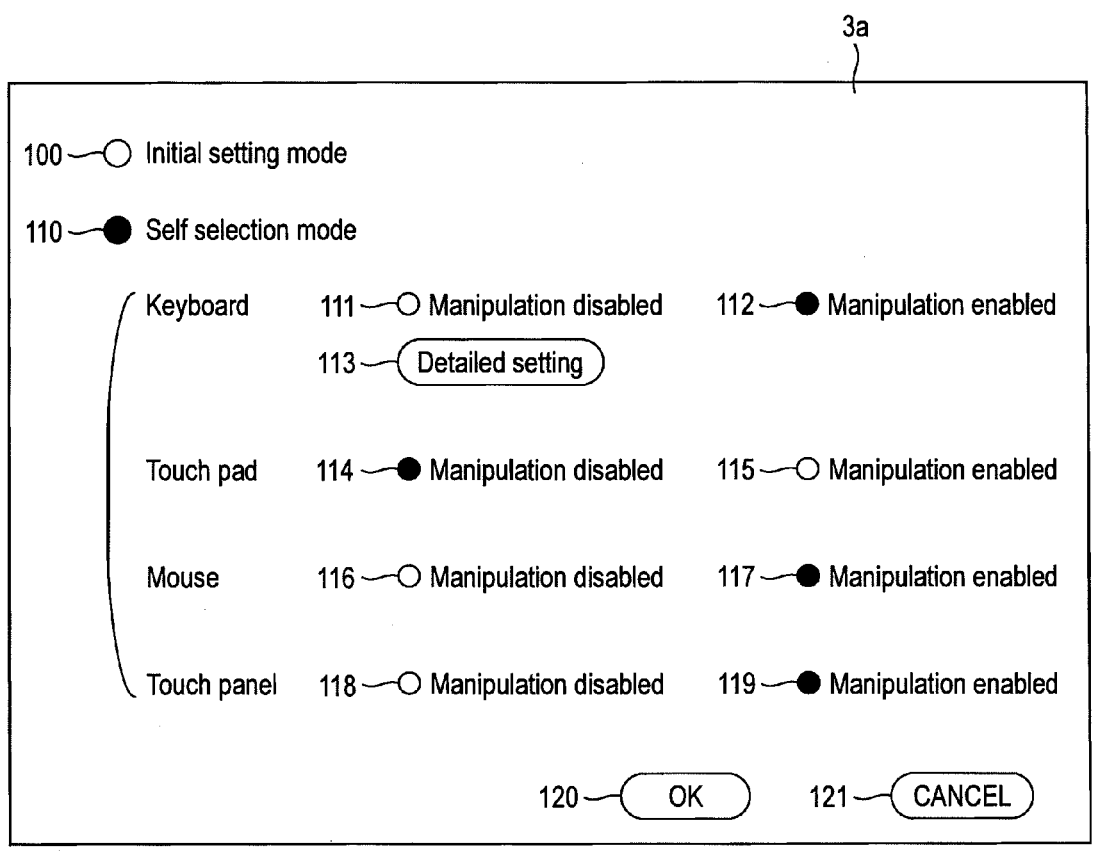
FIG. 3 is a picture used in the first embodiment through which to set an input device to be disabled.

Next, an example of how a control, to be performed during a wireless communication, of an input device(s) is set will be described with reference to FIG. 3. In this specification, the term "control of an input device" means disablement of manipulation of a set input device. FIG. 3 is a picture used in the first embodiment through which to set an input device to be disabled.

A radio button 100 for selecting an initial setting mode and a radio button 110 for selecting a self selection mode can be selected exclusively. The initial setting mode is a mode in which processing indicated by a manipulation signal supplied from a preset input device(s) is not performed. That is, an input device(s) with which noise or physical contact may occur from the position of the communication module 22 is set in advance as an input device(s) for which processing indicated by a manipulation signal generated by it should not be performed. The self selection mode is a mode in which processing indicated by a manipulation signal supplied from an input device(s) selected by the user is not performed. When the radio button 110 is selected, buttons that are shown under the item "self selection mode" are rendered selectable. The term "manipulation disabled" means that processing indicated by a manipulation signal is not performed.

Figure 4:
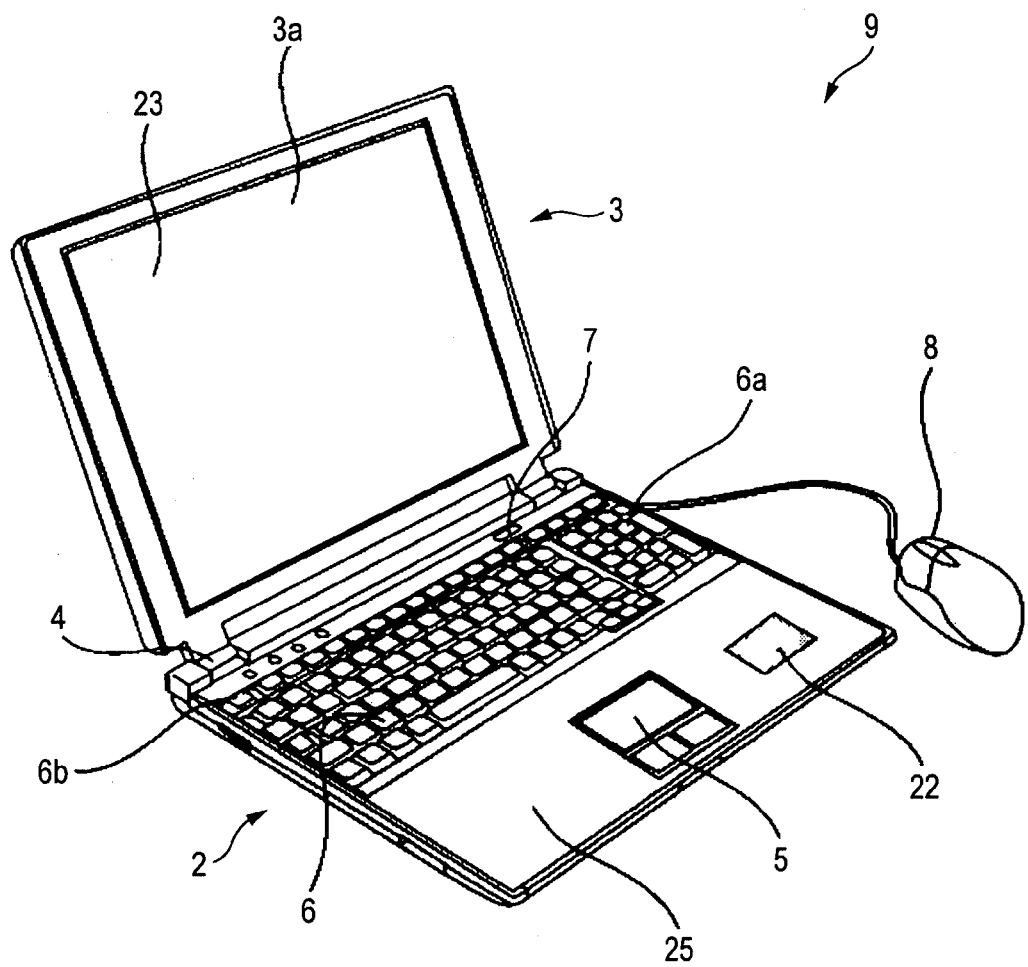
FIG. 4 is a perspective view showing an appearance of a second personal computer according to the first embodiment.

For the keyboard 6, a radio button 111 for selecting disablement of its manipulation during a wireless communication and a radio button 112 for selecting enablement of its manipulation during a wireless communication can be selected exclusively. When the radio button 111 is selected, a details setting button 113 is rendered selectable. If the details setting button 113 is selected, enablement/disablement can be set for each key of the keyboard 6. A control which is performed on a key-by-key basis will be described with reference to FIG. 4. FIG. 4 is a perspective view of a second personal computer 9 according to the first embodiment. In the second personal computer 9, a ten-key unit 6a is provided on the right of a keyboard 6 and function keys 6b are provided on the rear side. A key-by-key control is realized in such a manner that only the ten-key unit 6a is enabled or only the function keys 6a are enabled.

For the touch pad 5, a radio button 114 for selecting disablement of its manipulation during a wireless communication and a radio button 115 for selecting enablement of its manipulation during a wireless communication can be selected exclusively.

For the mouse 8, a radio button 116 for selecting disablement of its manipulation during a wireless communication and a radio button 117 for selecting enablement of its manipulation during a wireless communication can be selected exclusively.

For the touch panel 23, a radio button 118 for selecting disablement of its manipulation during a wireless communication and a radio button 119 for selecting enablement of its manipulation during a wireless communication can be selected exclusively.

A button 120 for selecting storage of settings made and ending of the setting procedure and a button 121 for selecting cancellation of the setting procedure can be selected exclusively. Settings made are stored in the HDD 16.

Figure 5:
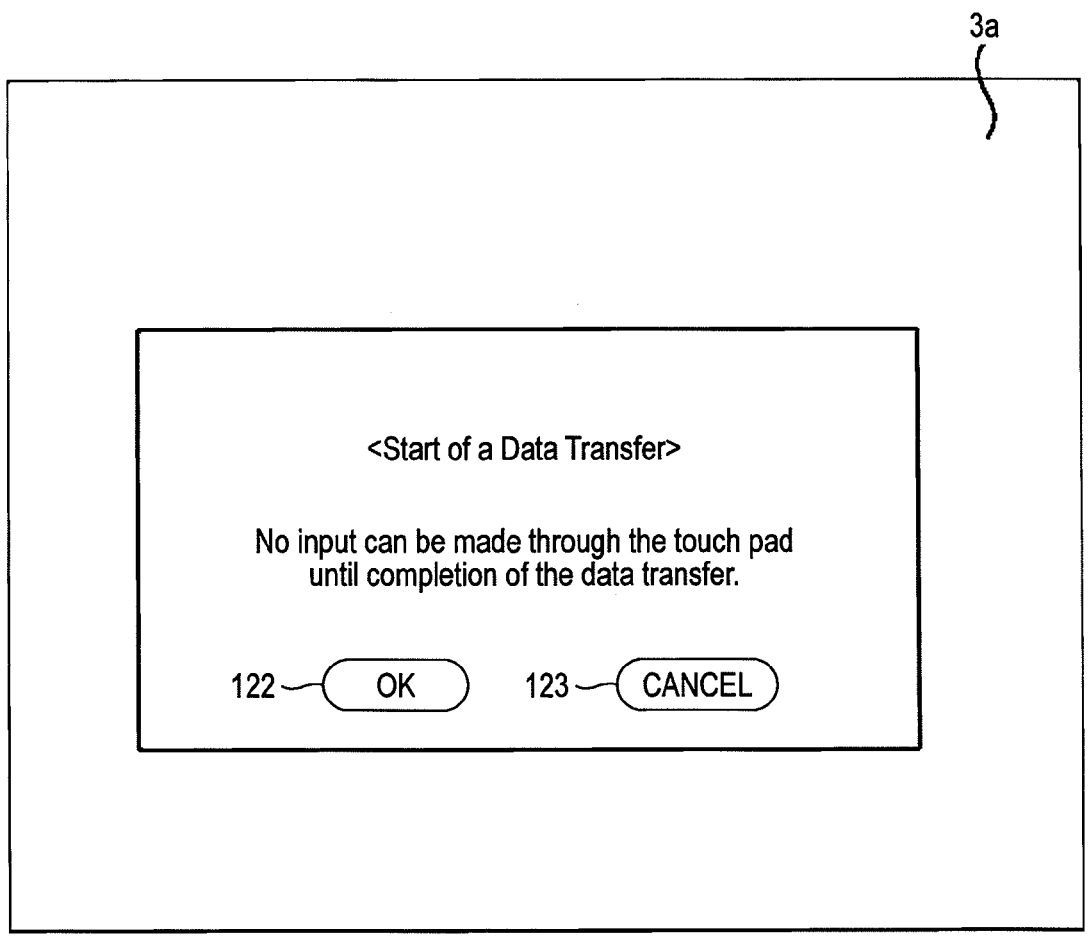
FIG. 5 shows an example picture for informing the user of an input device control, about to be performed, in the first embodiment.

Next, a description will be made of how the personal computer 1 operates in disabling an input device for which disablement has been set in the above-described manner when the communication module 22 starts a data transfer by a wireless communication. In the first embodiment, a picture as shown in FIG. 5 is presented before disabling an input device. FIG. 5 shows an example picture for informing the user of disablement, about to be made, of an input device in the first embodiment. The reason why such a picture is presented is that if an input device is disable without any warning, input manipulation is disabled suddenly during use of the personal computer 1, which is inconvenient to the user and the user may erroneously recognize it as a failure in the input device. Furthermore, even where disablement of an input device is set in advance, for a certain reason a transfer may require manipulation of the input device. In view of the above, a button 112 for selecting a start of the data transfer in a state that the input device is disablement-controlled and a button 123 for selecting non-starting of the data transfer in a state that the input device is disablement-controlled can be selected exclusively.

Figure 6:
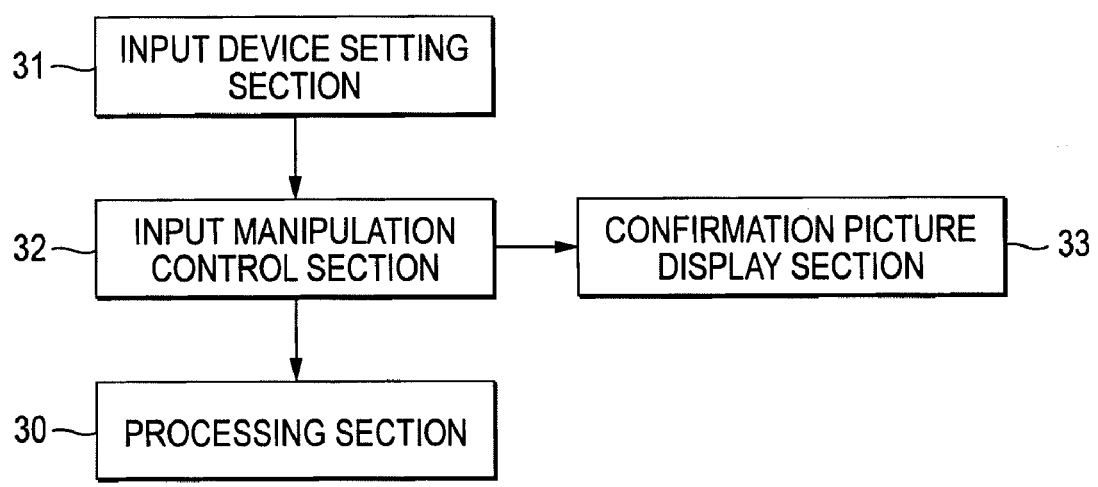
FIG. 6 is a functional block diagram showing functions of the first personal computer according to the first embodiment.

Next, a description will be made of a procedure according to the first embodiment for setting an input device(s) for which manipulation during a wireless communication should be disabled. First, functions of the personal computer 1 according to the first embodiment will be described. FIG. 6 is a functional block diagram showing the functions of the personal computer 1 according to the first embodiment. Each of the functional blocks shown in FIG. 6 performs its function as an application relating to the input device setting is read out and run by the CPU 10.

A processing module 30 performs processing that is indicated by a manipulation signal generated by each of the input devices such as the touch pad 5 and the keyboard 6.

An input device setting module 31 is stored with an initial setting of an input device(s) that is set in advance as an input device for which processing indicated by a manipulation signal generated by it should not be performed. Furthermore, when the user has selected an input device for which processing indicated by a manipulation signal generated by it should not be performed, the input device setting module 31 sets the selected input device as such an input device. The setting is done by storing a designation of each selected input device and prohibiting execution of processing indicated by a manipulation signal generated by it. Alternatively, the setting may be done by storing designations of non-selected input devices and permitting execution of pieces of processing indicated by manipulation signals generated only by the input devices whose designations are stored. Where enablement/disablement of manipulation is set on a key-by-key basis as in the second personal computer 9 shown in FIG. 4, control settings for the respective keys are also stored.

An input manipulation control module 32 refers to the information stored in the input device setting module 31 and controls the processing module 30 so that it does not perform processing indicated by a manipulation signal supplied from the input device(s) whose designation is stored.

A confirmation picture display section 33 generates display data for display of a picture that prompts the user to confirm that a disablement control on an input device that has been set by the input device setting module 31 should be performed and displays the generated display data on the display device 3a.

Figure 7:
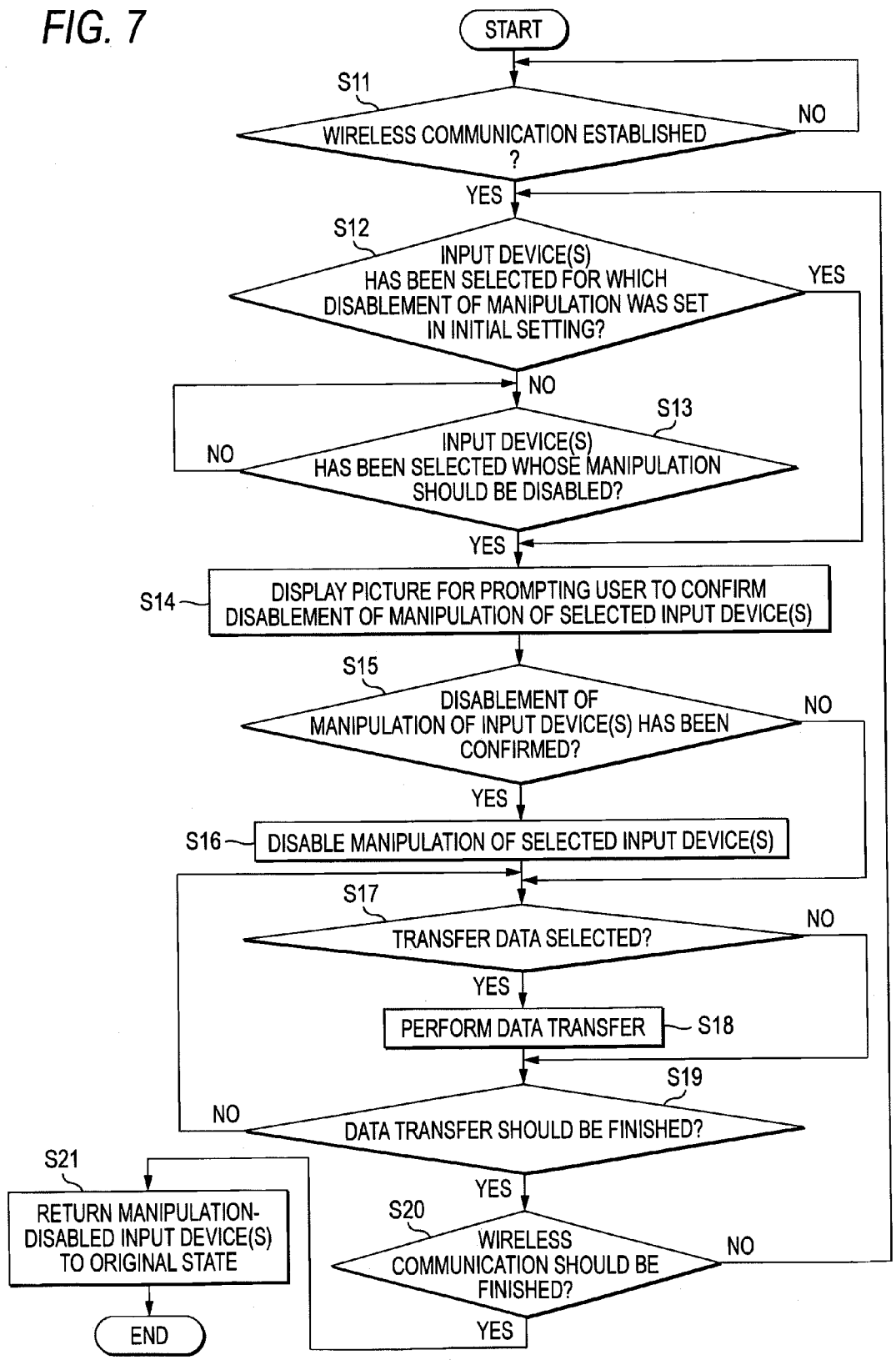
FIG. 7 is a flowchart of a setting procedure according to the first embodiment which is followed when an input device(s) is controlled in connection with a wireless communication.

Next, the operation of the personal computer 1 according to the first embodiment will be described. FIG. 7 is a flowchart of a setting procedure according to the first embodiment which is followed when an input device(s) is controlled in connection with a wireless communication. This process is executed as an application relating to the input device setting is run by the CPU 10 and the functions of the above-described respective function blocks are performed. The process will be described for an example in which setting items are selected as shown in FIG. 3.

In this specification, the term "control of an input device" means disablement of manipulation of a set input device. Example methods for disabling manipulation of an input device are to disable a manipulation signal generated by it and to disable its manipulation signal generating function. A wireless communication performed by the communication module 22 will not be described in detail because it is performed by a known technology.

First, at step S11, it is judged whether a wireless communication with an external apparatus has been established in the communication module 22. If it is judged that no wireless communication has been established yet (S11: no), the ensuing steps will not be executed until it is judged that a wireless communication has been established. On the other hand, if it is judged that a wireless communication has been established (S11: yes), at step S12 it is judged whether the input device(s) is selected which is set in the initial setting as an input device (s) whose manipulation should be disabled. That is, it is judged whether the radio button 100 (see FIG. 3) is selected. The initial setting is stored in the input device setting module 31.

If it is judged that the input device(s) that is manipulation-disablement-set in the initial setting is selected (S12: yes), that is, if it is judged that the radio button 100 is selected, the process moves to step S14. On the other hand, if it is judged that the input device(s) that is manipulation-disablement-set in the initial setting is not selected (S12: no), that is, if it is judged that the radio button 110 is selected, then it is judged at step S13 whether an input device whose manipulation should be disabled has been selected by a radio button (and the details setting button 113) (see FIG. 3). In the example of FIG. 3, the radio button 114 is selected, which means that the touch pad 5 is selected as an input device whose manipulation should be disabled. The selection information is stored in the input device setting module 31.

If it is judged that no input device whose manipulation should be disabled has been selected (S13: no), the ensuing steps will not be executed until it is judged that an input device whose manipulation should be disabled has been selected. On the other hand, it is judged that an input device whose manipulation should be disabled has been selected (S13: yes), that is, if at least one of the radio buttons 111, 114, 116, and 118 has been selected, at step S14 a picture for prompting the user to confirm disablement of manipulation of the selected input device(s) is displayed. That is, the picture shown in FIG. 5 is presented to the user. The confirmation picture is displayed by the confirmation picture display section 33.

At step S15, it is judged whether disablement of manipulation of the input device(s) has been selected through the confirmation picture. If it is judged that disablement has not been selected (S15: no), that is, if the button 123 (see FIG. 5) has been selected, the process moves to step S17. On the other hand, if it is judged that disablement has been selected (S15: yes), that is, if the button 122 (see FIG. 5) has been selected, at step S16 manipulation of the selected input device(s) is disabled. That is, manipulation of the touch pad 5 is disabled that is selected as a input device whose manipulation should be disabled (see FIG. 3). The disablement of manipulation is done by the input manipulation control module 32's controlling the processing module 30.

Although in the embodiment step S14 is located upstream of step S16, they may be interchanged, that is, the confirmation picture may be displayed after the selected input device (s) is disabled for the time being.

The ensuing steps are steps relating to a wireless communication for a data transfer and hence will not be described in detail. At step S17, it is judged whether data of video, music, or the like to be transferred from the communication partner apparatus to the personal computer 1 has been selected. If it is judged that no data to be transferred has been selected yet (S17: no), the process moves to step S19. On the other hand, if it is judged that data to be transferred has been selected (S17: yes), at step S18 the selected data is transferred.

At step S19, it is judged whether ending of the data transfer has been selected.

If it is judged that ending of the data transfer has not been selected (S19: no), the process returns to step S17. On the other hand, if it is judged that ending of the data transfer has been selected (S19: yes), then it is judged at step S20 whether ending of the wireless communication has been selected.

If it is judged that ending of the wireless communication has not been selected (S20: no), the process returns to step S12. On the other hand, if it is judged that ending of the wireless communication has been selected (S20: yes), the input device(s) whose manipulation has been disabled is returned to the original state, that is, the touch pad 5 is enabled again.

As described above, when the communication module 22 performs a wireless communication, the first embodiment can prevent an unintended input due to noise or physical contact involving the communication partner apparatus by disabling manipulation of an input device(s). That is, the first embodiment can prevent occurrence of, for example, loss of data due to an unintended input during, for example, a data transfer by a wireless communication. Furthermore, an input device(s) whose manipulation should be disabled can be selected from plural input devices provided. Therefore, a manipulation on another application or the like can be performed even during a wireless communication by using an input device(s) whose manipulation is not disabled. For example, the user can view video using another reproduction application in the case where a data transfer takes long time. Unnecessary data transfers can be omitted by selecting, during a data transfer, data to be transferred from a data list that is stored in the communication partner apparatus. As such, the first embodiment can secure a stable wireless communication while enabling necessary manipulations by selecting an input device(s) whose manipulation during the wireless communication is enabled.

Figure 8:
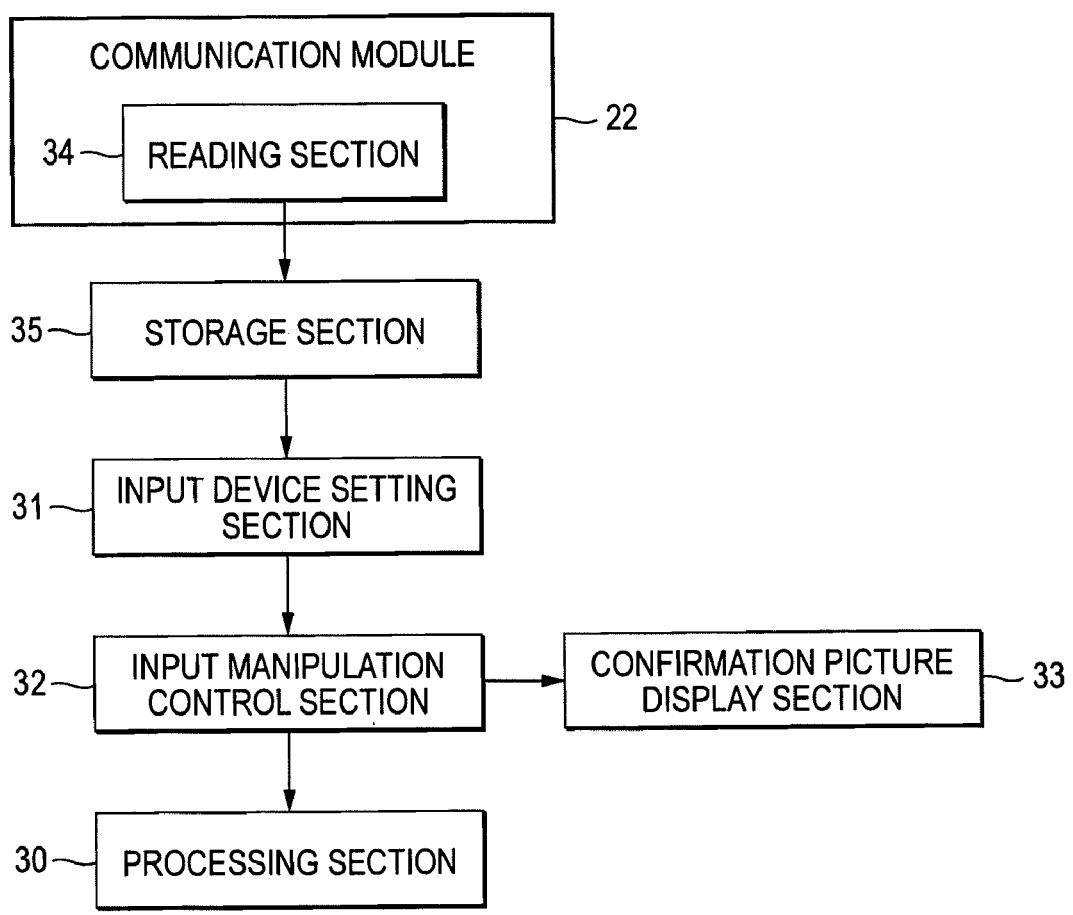
FIG. 8 is a functional block diagram showing functions of a personal computer according to a second embodiment.

Next, a second embodiment will be described with reference to FIGS. 8 and 9. Since communication partner apparatus with which the communication module 22 performs a wireless communication would have various shapes, it is desirable that an input device(s) corresponding to the type of a communication partner apparatus be disablement-controlled. In view of this, in the second embodiment, when the communication module 22 performs a wireless communication, an input device(s) whose manipulation should be disabled is selected automatically according to the type of the communication partner apparatus. For example, physical contact hardly occurs in a communication with an apparatus that is thin (i.e., small in height) such as a cell phone. Therefore, in this case, it is more convenient to allow the keyboard 6 to be manipulated ordinarily. On the other hand, in the case of a communication with such an apparatus as a video camera, even if it is the same in placement area as a cell phone (mentioned above), it may fall to contact the keyboard 6 because it is tall. In this case, it is necessary to disable manipulation of the keyboard 6 to thereby prevent an unintended input from the keyboard 6.

A description will be made of a procedure according to the second embodiment for setting an input device for which manipulation during a wireless communication should be disabled. First, functions of a personal computer 1a according to the second embodiment will be described. FIG. 8 is a functional block diagram showing the functions of the personal computer 1a according to the second embodiment.

In the second embodiment, functional blocks having the same ones in the first embodiment are given the same reference symbols as the latter and will not be described in detail. In the second embodiment, a reading module 34 and a storage module 35 are added to the functional blocks according to the first embodiment.

The reading module 34, which is provided in the communication module 22, reads an identification signal of a communication partner apparatus.

The storage module 35 stores the identification signal read by the reading module 34 in such a manner that it is correlated with a type of the communication partner apparatus. The storage module 35 may be provided in either the communication module 22 or the main memory 12.

The input device setting module 31 sets an input device(s) for which processing indicated by a manipulation signal generated by it should not be performed according to a type of a communication partner apparatus stored in the storage module 35. The setting may be made either by storing a type(s) of a communication partner apparatus corresponding to each input device for which processing indicated by a manipulation signal generated by it should not be performed or by storing a type(s) of a communication partner apparatus corresponding to each input device for which processing indicated by a manipulation signal generated by it should be performed. For example, for communication partner apparatus that are classified into the cell phone, a setting is made so that manipulation of only the touch pad 5 is disabled. For communication partner apparatus that are classified into the video camera, settings are made so that manipulation of the touch pad 5 and the keyboard 6 is disabled.

Next, the operation of the personal computer 1a according to the second embodiment will be described with reference to FIG. 9. FIG. 9 is a flowchart of a setting procedure according to the second embodiment which is followed when an input device(s) is controlled in connection with a wireless communication. Steps having the same steps in the first embodiment are given the same reference symbols as the latter and will not be described in detail. This process is executed as an application relating to the input device setting is run by the CPU 10 and the functions of the above-described respective function blocks are performed. In this specification, a wireless communication and identification of a communication partner apparatus which are performed by the communication module 22 will not be described in detail because they are performed by known technologies.

First, if it is judged that a wireless communication with an external apparatus has been established in the communication module 22 (S11: yes), then it is judged at step S32 whether the communication partner apparatus has been identified. The identification of a communication partner apparatus means that the reading module 34 reads an identification signal and the identification signal is stored in the storage module 35 so as to be correlated with a type of the communication partner apparatus.

If it is judged that the communication partner apparatus has not been identified yet (S32: no), the ensuing steps will not be executed until it is judged that the communication partner apparatus has been identified. On the other hand, if it is judged that the communication partner apparatus has been identified (S32: yes), at step S33 a picture for prompting the user to confirm disablement of manipulation of an input device(s) corresponding to the type of the communication partner apparatus is displayed. The confirmation picture is displayed by the confirmation picture display section 33.

At step S34, it is judged whether disablement of manipulation of the input device(s) corresponding to the type of the communication partner apparatus has been selected. If it is judged that disablement has not been selected (S34: no), the process moves to step S17. On the other hand, if it is judged that disablement has been selected (S34: yes), at step S35 manipulation of the selected input device(s) corresponding to the type of the communication partner apparatus is disabled. The disablement of manipulation is done by the input manipulation control module 32's controlling the processing module 30.

Although in the embodiment step S33 is located upstream of step S35, they may be interchanged, that is, the confirmation picture may be displayed after the selected input device (s) corresponding to the type of the communication partner apparatus is disabled for the time being.

The steps following step S35 (i.e., step S17 and the ensuing steps) will not be described because they were described in the first embodiment.

As described above, when the communication module 22 performs a wireless communication, the second embodiment can prevent an unintended input due to noise or physical contact involving the communication partner apparatus by disabling manipulation of an input device(s). That is, the second embodiment can prevent occurrence of, for example, loss of data due to an unintended input during, for example, a data transfer by a wireless communication. Furthermore, an input device(s) whose manipulation should be disabled can be set automatically according to a type or the like of the communication partner apparatus among plural input devices provided. Therefore, a manipulation on another application can be performed even during a wireless communication by using an input device(s) whose manipulation is not disabled. As such, the second embodiment can secure a stable wireless communication while enabling necessary manipulations by automatically setting an input device(s) whose manipulation during the wireless communication is enabled.

The invention is not limited to the above embodiments themselves and, in the practice stage, may be embodied in such a manner that constituent elements are modified without departing from the spirit and scope of the invention. And various inventions can be conceived by properly combining plural constituent elements disclosed in each embodiment. For example, several ones of the constituent elements of each embodiment may be omitted. Furthermore, constituent elements of different embodiments may be combined as appropriate.

As described with reference to the above embodiment, there is provided an information processing apparatus capable of securing a stable wireless communication by disabling manipulation of a prescribed input device(s) during a wireless communication.

The embodiment makes it possible to secure a stable wireless communication by disabling manipulation of a prescribed input device(s) during a wireless communication.

What is claimed is:

1. An information processing apparatus comprising:
a main body;
a wireless communication module provided on a top face of the main body and configured to perform a close-range wireless communication with another apparatus in a state where the other apparatus is placed thereon;
an input device provided on the top face of the main body;
a display module provided to the main body;
a processing module configured to perform a process indicated by a manipulation signal inputted from the input device;
an input manipulation control module configured to control the processing module so as not to perform the processing indicated by the manipulation signal inputted from the input device and to display an indication that a manipulation of the input device is disabled on the display module, when the close-range wireless communication is being performed by the wireless communication module.

2. The apparatus of claim 1,
an input device setting module configured to set, when a plurality of input devices are provided on the top face of the main body, an input device among the plurality of input devices for which the processing module does not perform the processing indicated by the manipulation signal inputted from the plurality of input devices, wherein the input manipulation control module controls the processing module so as not to perform the processing indicated by the manipulation signal inputted from the input device that has been set by the input device setting module, when the close-range wireless communication is being performed by the wireless communication module.

3. The apparatus of claim 2,
a reading module configured to read an identification signal of a communication partner apparatus, when the close-range wireless communication is being performed by the wireless communication module; and
a storage module configured to store the identification signal correspondingly with a type of the communication partner apparatus,
wherein the input device setting module sets the input device for which the processing indicated by the manipulation signal is not performed, in accordance with the type of the communication partner apparatus stored in the storage module.

4. The apparatus of claim 2,
wherein the input device setting module sets so that the processing indicated by the manipulation signal inputted from a predetermined key is not performed, the predetermined key being of plural keys in a keyboard provided on the top face of the main body.

* * * * *